(12) United States Patent
Nishida et al.

(10) Patent No.: US 9,112,244 B2
(45) Date of Patent: Aug. 18, 2015

(54) BATTERY PACK

(75) Inventors: Daisuke Nishida, Hyogo (JP); Masatsugu Naka, Hyogo (JP); Takuya Hamada, Hyogo (JP); Kazuyuki Kawakami, Hyogo (JP); Hiroki Teraoka, Hyogo (JP); Junpei Ito, Hyogo (JP); Yasuhiro Kaizaki, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 205 days.

(21) Appl. No.: 13/983,860

(22) PCT Filed: Jan. 17, 2012

(86) PCT No.: PCT/JP2012/050818
§ 371 (c)(1),
(2), (4) Date: Sep. 16, 2013

(87) PCT Pub. No.: WO2012/108233
PCT Pub. Date: Aug. 16, 2012

(65) Prior Publication Data
US 2014/0004390 A1    Jan. 2, 2014

(30) Foreign Application Priority Data
Feb. 8, 2011    (JP) ................. 2011-024803

(51) Int. Cl.
| H01M 10/42 | (2006.01) |
| H01M 2/20 | (2006.01) |
| H01M 10/22 | (2006.01) |
| H01M 2/22 | (2006.01) |

(52) U.S. Cl.
CPC ............. *H01M 10/425* (2013.01); *H01M 2/20* (2013.01); *H01M 2/22* (2013.01)

(58) Field of Classification Search
None
See application file for complete search history.

(56) References Cited

U.S. PATENT DOCUMENTS

| 2011/0014942 A1* | 1/2011 | Van Schyndel et al. ... 455/550.1 |
| 2012/0033845 A1* | 2/2012 | Maleki et al. ................. 381/386 |

FOREIGN PATENT DOCUMENTS

| JP | 3-112868 | 11/1991 |
| JP | 2002-100893 | 4/2002 |
| JP | 2003-242956 | 8/2003 |
| JP | 2004-103248 | 4/2004 |
| JP | 2004-185861 | 7/2004 |
| JP | 2007-317668 | 12/2007 |

OTHER PUBLICATIONS

International Search Report issued Mar. 27, 2012 in International Application No. PCT/JP2012/050818.

* cited by examiner

*Primary Examiner* — Gregg Cantelmo
(74) *Attorney, Agent, or Firm* — Wenderoth, Lind & Ponack, L.L.P.

(57) ABSTRACT

In a battery pack (1),a current loop between the positive and negative electrode plates of an electrode assembly passes points P1, P2, P3, P4, P5, P6, P7, P8, P9, P10, P11, P12, P13 and P14 in this order. A line that connects P2 to P3 intersects a line that connects P11 to P12 in the part where the loop passes a sealing plate (12), which is arranged on the top of a battery unit (10). The loop can be divided into loop parts B1 and B2. The part B1 is formed on the exterior side of the battery unit, and extends from the intersection A through a circuit board (20) back to the intersection A. The part B2 is formed on the interior side of the battery unit relative to the intersection A. The current flows counterclockwise and clockwise in the parts B1 and B2, respectively.

8 Claims, 13 Drawing Sheets

BATTERY PACK

BACKGROUND OF THE INVENTION

1. Field of the Invention

The present invention relates to a battery pack that includes a battery unit and a circuit board, and in particular to a battery pack that includes a rectangular battery unit and a circuit board that is arranged on or above an exterior surface of a sealing member or exterior container of the rectangular battery unit.

2. Description of the Related Art

Rectangular rechargeable lithium-ion batteries and polymer batteries have been developed for mobile electronic devices. The rectangular rechargeable lithium-ion batteries typically include a low-profile exterior container, an electrode assembly, a sealing plate, and positive and negative electrode tabs. The low-profile exterior container has a bottom-closed hollow shape. The electrode assembly includes positive and negative electrode plates that face each other, and are accommodated in the exterior container. The opening of the exterior container is closed by the sealing plate. The positive electrode tab extends from the positive electrode plate, and is connected to the sealing plate. The negative electrode tab extends from the negative electrode plate, and is connected to a negative terminal. The negative terminal passes through the sealing plate.

Also, battery packs have been developed and widely used which include a circuit board that is arranged on or above the exterior surface of the aforementioned type of battery unit.

FIG. 6 shows a battery pack that includes a typical rectangular lithium ion battery.

The battery pack shown in FIG. 6 includes a protection circuit in a circuit board 120, and external positive and negative terminals (P24, P26) that are arranged on or above an exterior surface of the circuit board 120. Electric power is supplied through the external positive and negative terminals from the battery pack.

In addition, positive and negative electrode tabs 116 and 117 extend toward a sealing plate 112, and are arranged in parallel to each other in a battery unit.

Also, a positive terminal (P23) and a negative terminal 113 on or above the sealing plate 112 of the battery unit are connected to the circuit board 120 through a connection lead 131 and a lead-equipped safety device 132, respectively. Thus, electric power can be supplied through the circuit board and the external positive and negative terminals from the battery unit to an external circuit (P25).

In the battery pack including the aforementioned battery unit, when electric power is supplied, a current loop is formed from the battery unit to the circuit board, and will produce flux linkage.

The current loop is shown by the lines that connect points of P21 to P33 in FIG. 6.

As shown in FIG. 6, the current loop is formed from the positive electrode plate of the electrode assembly through the positive electrode tab 116 (P21, P22), the positive terminal (P23) on the sealing plate 112, the external positive and negative terminals (P24, P26) on the circuit board 120, wiring (P26 to P29) on the circuit board 120, the lead-equipped safety device 132, the negative terminal 113 and the negative electrode tab 117 to the negative electrode plate of the electrode assembly.

Thus, the formed current loop has a relatively large loop area, which extends from the interior side of the battery unit through the exterior-side circuit board back to the interior side of the battery unit.

This current loop will produce flux linkage. This flux linkage may cause EMI (Electro Magnetic Interference) on a mobile electronic device, which in turn may cause malfunctions of the electronic device.

For this reason, it is required to prevent EMI. In particular, in the case where the output of the battery is high, the flux linkage will be also high. Correspondingly, it is required to prevent EMI.

Japanese Patent Laid-Open Publication No. JP 2003-242, 956 A discloses a battery module which addressed this. The battery module includes a plurality of batteries that are connected to each other through bus bars. The plurality of batteries are arranged in particular arrangement, and connected to each other in a particular connection order so as to prevent EMI. The particular arrangement and the particular connection order form a plurality of loop circuits in the connection path. The current flows in the loop circuit adjacent to each other are opposite to each other so that the magnetic fields that are produced by the plurality of loop circuits cancel each other.

This technology is effective at reducing the total strength of the produced magnetic fields, but cannot be applied to battery packs that include one rectangular battery unit that is provided with the circuit as discussed above.

Also, Japanese Patent Laid-Open Publication No. JP 2007-317,668 A discloses a battery pack that includes an electromagnetic wave shielding plate that is arranged along the battery pack. It can be said that this battery pack is effective at preventing EMI. On the other hand, it is also required to suppress electromagnetic waves without such an electromagnetic wave shielding plate in battery packs that are required to be thin or small.

The present invention is aimed at solving the above problems, and its main object is to provide a battery pack that includes a circuit board on an exterior surface of a battery unit but can suppress EMI without an electromagnetic wave shielding plate, and the like.

SUMMARY OF THE INVENTION

To achieve the above object, a battery pack according to a first aspect of the present invention includes a battery unit, a circuit board, first and second wiring paths. The battery unit includes a bottom-closed hollow exterior container, an electrode assembly of positive and negative electrode plates, positive and negative electrode tabs, and a sealing plate. The positive and negative electrode plates face each other, and are accommodated in the exterior container. The positive and negative electrode tabs extend from the positive and negative electrode plates, and are arranged in parallel to each other in the exterior container. The sealing plate closes the opening of the exterior container. The circuit board is arranged on an exterior surface of the battery unit, and includes external positive and negative terminals through which electric power can be supplied. The first wiring path connects the positive electrode tab to the external positive terminal through the sealing plate and the circuit board. The second wiring path connects the negative electrode tab to the external negative terminal through the sealing plate and the circuit board. A current loop is formed from the positive electrode plate through the positive electrode tab, the first wiring path, the external positive terminal, the external negative terminal, the second wiring path and the negative electrode tab in this order to the negative electrode plate when electric power is supplied. As viewed in a plan view along the positive and negative electrode tabs, which are arranged in parallel to each other, in the current loop shape that is projected onto this plan view, the first and second wiring paths intersect each other at the position where the first and second wiring paths pass the sealing plate, and the current flow direction of a current loop part that is formed from the intersection position on the exterior side of the battery unit is opposite to the current flow direction of another current loop part that is formed from the intersection position on the interior side of the battery unit.

In addition to the features of the aforementioned battery pack, the exterior container has a rectangular box shape. The positive and negative electrode tabs extend toward the sealing plate in the exterior container. The circuit board extends along, and is spaced away from the exterior surface of the sealing plate. In this case, the battery pack according to the present invention can be particularly effective at achieving the above object.

In the battery pack according to the first aspect of the present invention, it is preferable that the negative terminal pass through, and be electrically insulated from the sealing plate. Also, it is preferable that, in the first wiring path, one end of the positive electrode tab be connected to an interior surface of the sealing plate, and the sealing plate be connected through a first lead to the circuit board. Also, it is preferable that the negative terminal be positioned between the connection position between the sealing plate and the positive electrode tab, and the connection position between the sealing plate and the first lead. Also, it is preferable that, in the second wiring path, the negative electrode tab be connected to the negative terminal on the interior side of the sealing plate, and a second lead member be provided which is arranged on the exterior side of the sealing plate and extends from the negative terminal to the circuit board.

In this case, it is preferable that the first lead be positioned right above the negative electrode tab, and the second lead be positioned right above the positive electrode tab.

In addition, to achieve the above object, a battery pack according to a second aspect of the present invention includes a battery unit, a circuit board, first and second wiring paths. The battery unit includes a bottom-closed hollow exterior container, an electrode assembly of positive and negative electrode plates, positive and negative electrode tabs, and a sealing plate. The positive and negative electrode plates face each other, and are accommodated in the exterior container. The positive and negative electrode tabs extend from the positive and negative electrode plates, and are arranged in parallel to each other in the exterior container. The sealing plate closes the opening of the exterior container. The circuit board is arranged on or above an exterior surface of the battery unit, and includes external positive and negative terminals through which electric power can be supplied. The first wiring path connects the positive electrode tab to the external positive terminal through the sealing plate and the circuit board. The second wiring path connects the negative electrode tab to the external negative terminal through the sealing plate and the circuit board. A current loop is formed from the positive electrode plate through the positive electrode tab, the first wiring path, the external positive terminal, the external negative terminal, the second wiring path and the negative electrode tab in this order to the negative electrode plate when electric power is supplied. The interval between exterior-side path parts of the first and second wiring paths each of which extends from the sealing plate to the circuit board is smaller than the interval between interior-side path parts of the first and second wiring paths each of which is located on the interior side of the sealing plate. Current flow directions in the exterior-side path parts are opposite to each other.

In the battery pack according to the second aspect of the present invention, in the case where the exterior container has a rectangular box shape, where the positive and negative electrode tabs extend toward the sealing plate in the exterior container, and where the circuit board extends along and is spaced away from the exterior surface of the sealing plate, it is preferable that the negative terminal pass through and be electrically insulated from the sealing plate, that a first lead member be provided which extends from the sealing plate to the circuit board in the first wiring path, that a second lead be provided which extends from the negative terminal to the circuit board in the second wiring path, and that the second lead member extend toward the first lead member from the negative terminal before reaching the circuit board.

Alternatively, in the battery pack according to the second aspect of the present invention, in the case where the exterior container has a rectangular box shape, where the positive and negative electrode tabs extend toward the sealing plate in the exterior container, where the circuit board extends along a side surface as the exterior surface of the exterior container, and where the negative terminal passes through and is electrically insulated from the sealing plate, a first lead member can be provided which extends from the sealing plate to the circuit board through the side of the exterior container in the first wiring path, and a second lead member can be provided in the second wiring path. The second lead member extends from the negative terminal to the circuit board, and faces the first lead member.

It is preferable that the interval between the first and second wiring paths be not smaller than 0.15 mm.

Effects of the Invention

According to the battery pack of the first aspect of the present invention, since the first and second wiring paths intersect each other at the position where the first and second wiring paths pass the sealing plate, and the current flow direction of a current loop part that is formed from the intersection position on the exterior side of the battery unit is opposite to the current flow direction of another current loop part that is formed from the intersection position on the interior side of the battery unit, magnetic fields opposite to each other are produced by the current loop parts, and cancel each other in the location close to the intersection position.

As a result, according to this battery pack, even in the case where a shielding plate or the like is not used, it is possible to reduce the total strength of magnetic fields that are produced by the current loop parts as compared with the aforementioned type of conventional battery pack.

In particular, in the case of a battery pack where the exterior container has a rectangular box shape, where the positive and negative electrode tabs extend toward the sealing plate, and where the circuit board extends along and is spaced away from the exterior surface of the sealing plate, as discussed above in the know art, a large current loop is likely formed which extends from the interior side though the exterior side back to the interior side of the battery unit so that a strong magnetic field may be formed. According to this present invention, since the total strength of the magnetic fields can be reduced, it is more effective at achieving the above object.

In the battery pack according to the first aspect of the present invention, in the case where the negative terminal passes through, and is electrically insulated from the sealing plate, where, in the first wiring path, one end of the positive electrode tab is connected to an interior surface of the sealing plate, and the sealing plate is connected through a first lead to the circuit board, where the negative terminal is positioned between the connection position between the sealing plate and the positive electrode tab, and the connection position between the sealing plate and the first lead, and where, in the second wiring path, the negative electrode tab is connected to the negative terminal on the interior side of the sealing plate, and a second lead member is provided which is arranged on the exterior side of the sealing plate and extends from the negative terminal to the circuit board, the first and second wiring paths can intersect each other at the position where the first and second wiring paths pass the sealing plate, In the case where the first lead is positioned right above the negative electrode tab, and the second lead is positioned right above the positive electrode tab, the current flow directions between the leads and the tabs can be opposite to each other. As a result, it is possible to further reduce the total strength of the magnetic fields.

According to the battery pack of the second aspect of the present invention, since the interval between exterior-side path parts of the first and second wiring paths each of which extends from the sealing plate to the circuit board is smaller than the interval between interior-side path parts of the first and second wiring paths each of which is located on the interior side of the sealing plate, and current flow directions in the exterior-side path parts are opposite to each other, the area of the current loop that is formed from the sealing plate through the exterior-side circuit board back to the sealing plate can be small. As a result, it is possible to reduce the strength of the magnetic field that is produced by the current loop. Also, magnetic fields can cancel each other in the exterior-side path parts the current flow directions of which are opposite to each other.

As a result, according to the battery pack of the second aspect of the present invention, it is also possible to reduce the strength of a magnetic field that is produced by the current loop as compared with the aforementioned type of conventional battery pack. In the case where an electrically insulating paper or the like provides an interval not smaller than 0.15 mm between the first and second wiring paths, it is possible to surely electrically insulate the first and second wiring paths from each other.

The above and further objects of the present invention as well as the features thereof will become more apparent from the following detailed description to be made in conjunction with the accompanying drawings.

DETAILED DESCRIPTION OF THE EMBODIMENT(S)

First Embodiment

Figure 1:
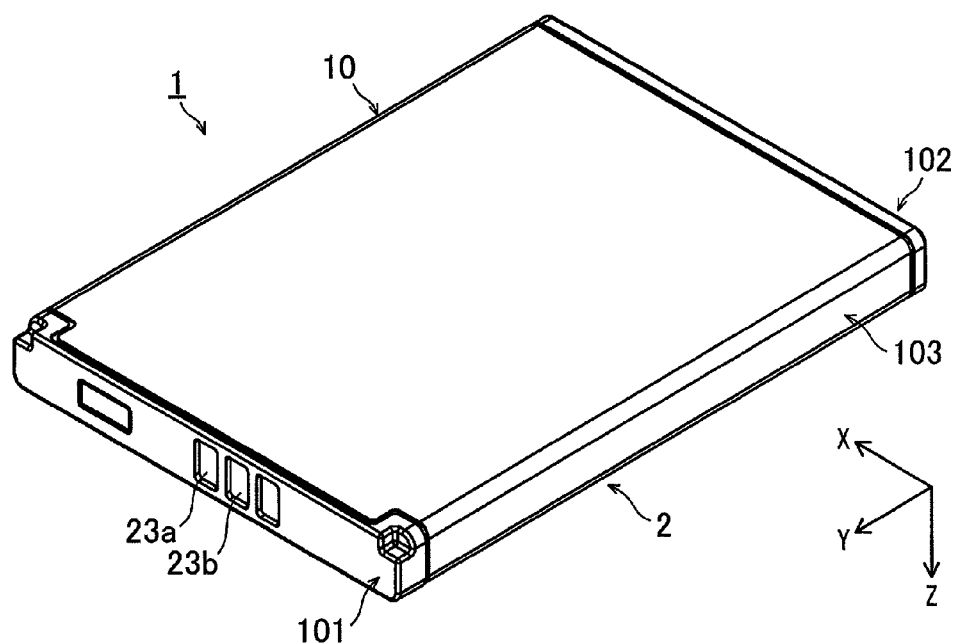
FIG. 1 is a perspective external view showing the exterior appearance of a battery pack 1 according to a first embodiment of the present invention.

FIG. 1 is a perspective external view showing a battery pack 1 according to a first embodiment of the present invention.

The battery pack 1 includes a core pack 2 having a rectangular battery unit 10, and a circuit board 20. The circuit board 20 extends along the top surface of the rectangular battery unit 10. A resin molding member 101 covers the circuit board 20. A bottom plate 102 is attached onto the bottom of the battery unit. An exterior label 103 is stuck onto the battery unit, and covers the entire exterior side surfaces of the battery unit 10.

The resin molding member 101 and the bottom plate 102 are formed of an electrically insulating material (e.g., resin material such as polycarbonate group resin).

Figure 2:
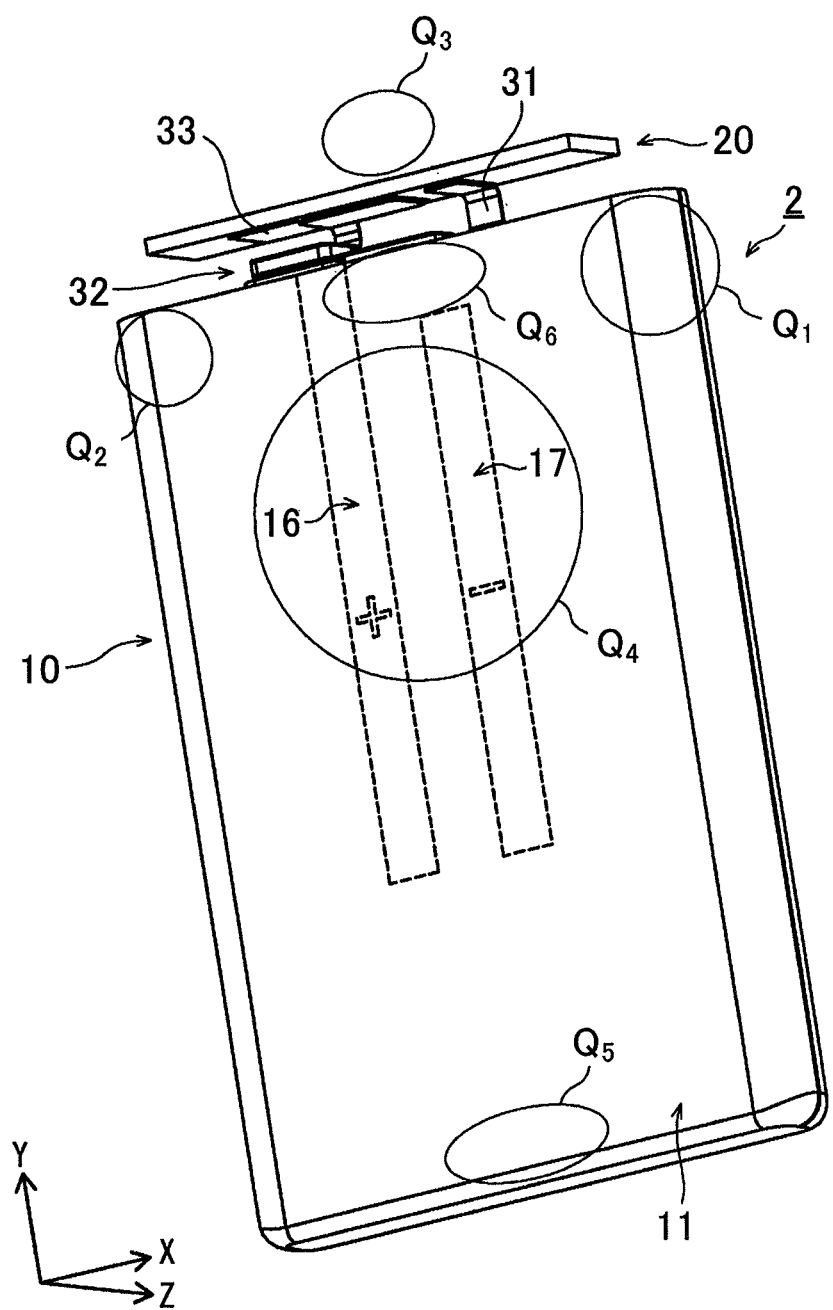
FIG. 2 is a perspective external view showing a core pack 2 of the battery pack 1 according to the first embodiment of the present invention.
Figure 3:
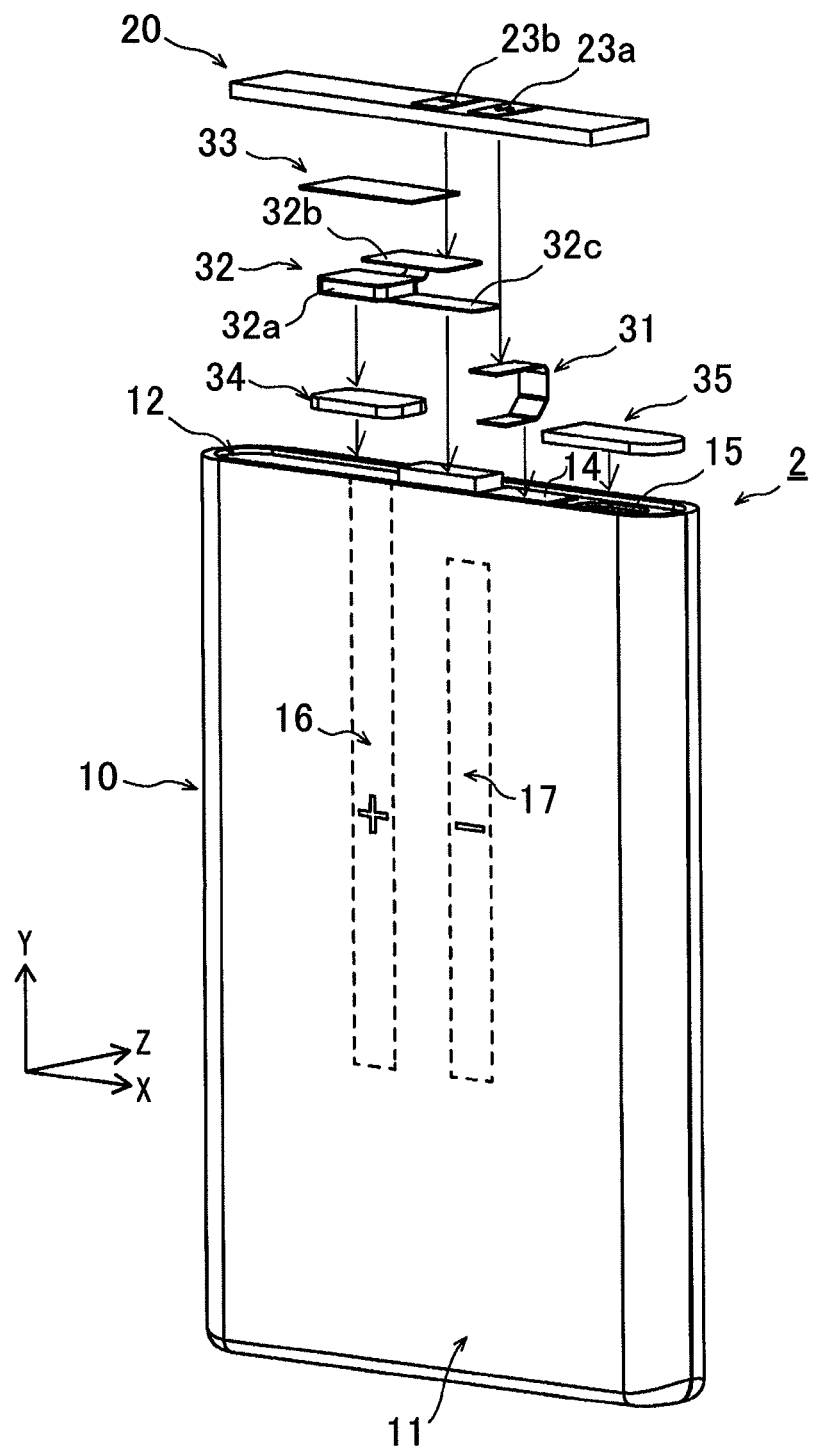
FIG. 3 is an exploded perspective view showing the core pack 2.

FIG. 2 is a perspective view showing the core pack 2. FIG. 3 is an exploded perspective view showing the core pack 2.

As shown in FIGS. 2 and 3, the battery unit 10 is a low-profile rectangular-box-shaped rechargeable lithium-ion battery. The battery unit includes a low-profile rectangular-box-shaped exterior container 11 formed of an Al alloy. The exterior container accommodates an electrode assembly, and is filled with an electrolyte. The opening of the exterior container 11 is closed by a sealing plate 12.

The sealing plate 12 is an elongated plate that extends in the right-and-left direction. A negative terminal 13 is formed in a protrusion, and is arranged in the central part of the sealing plate 12. A positive terminal 14 is a clad plate, and is arranged rightward relative to the negative terminal. A safety valve 15 is arranged in an end part of the sealing plate.

The negative terminal 13 passes an opening that is formed in the central part of the sealing plate 12, and protrudes in the top-and-bottom direction. The sealing plate 12 is electrically insulated by a gasket from the exterior container.

The low-profile exterior container 11 has four side surfaces. The front and back surfaces of the four side surfaces have a rectangular shape having a larger area. The right and left side surfaces, which are located beside the right and left sides of the front and back surfaces, have a narrow rectangular shape.

The circuit board 20 is a plate-shaped component on which devices of a protection circuit are mounted. External positive and negative terminals 23a and 23b for external connection are arranged on the upper surface of the circuit board.

The external positive terminal 23a and the external negative terminal 23b are exposed outward through windows that are formed on the top surface of the resin molding member 101.

A connection lead plate 31 and a lead-equipped safety device 32 are arranged on the sealing plate 12 of the battery unit 10 and spaced at an interval from each other. The connection lead plate and the lead-equipped safety device are interposed between the circuit board 20 and the sealing plate 12.

The connection lead plate 31 is an electrically conductive U-shaped plate, and connects the positive terminal 14 of the battery unit 10 to a positive terminal land, which is arranged on the bottom side of the circuit board 20.

A negative terminal land is arranged on the bottom side of the circuit board 20.

The lead-equipped safety device 32 includes a PTC component 32a, and leads 32b and 32c. The leads 32b and 32c are joined to the upper and lower surfaces of the PTC component 32a, respectively. The lead 32b stands on the right end part of the upper surface of the PTC component 32a, and extends rightward so that the leads 32b is connected to the negative terminal land of the circuit board 20. The lead 32c is connected to the upper part of the negative terminal 13 on the exterior side of the sealing plate 12.

Thus, the negative terminal land of the circuit board 20 is connected to the negative terminal 13 of the battery unit 10 through the lead-equipped safety device 32.

The electric insulating plate 33 is connected between the lead-equipped safety device 32 and the lower surface of the circuit board 20. Also, an electrically insulating plate 34 is connected between the lead 32c and the sealing plate 12. Thus, the lead and the sealing plate are electrically insulated from each other. Also, an electrically insulating plate 35 is connected between the right end part of the circuit board 20 and the sealing plate 12. Thus, the right end part of the circuit board and the sealing plate are electrically insulated from each other.

Positive and negative electrode tabs 16 and 17 are accommodated in the exterior container 11 of this battery unit 10. The positive and negative electrode tabs extend from positive and negative electrodes of the electrode assembly, respectively.

The positive and negative electrode tabs 16 and 17 are shown by broken lines in FIGS. 2 and 3. As shown in FIGS. 2 and 3, the positive and negative electrode tabs 16 and 17 extend in the top-and-bottom direction (Y direction), and spaced away from each other in right-and-left direction (X direction).

Figure 4A:
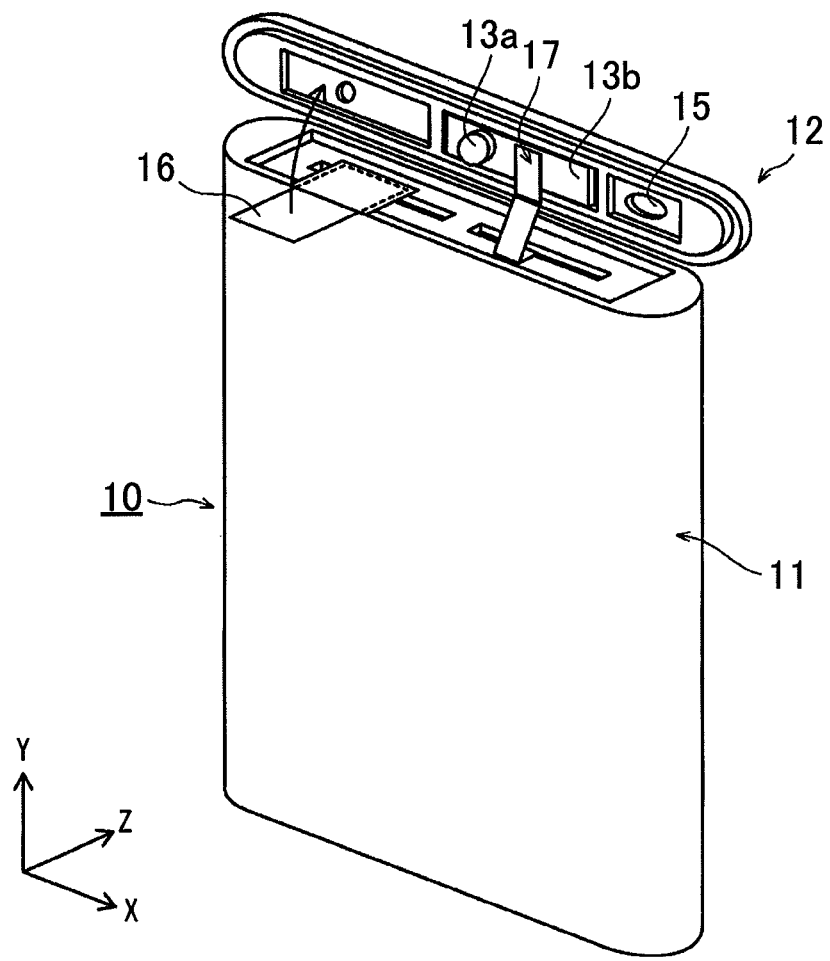
FIG. 4A is a perspective view showing the internal structure of a battery unit 10.

FIG. 4A is a perspective view showing the internal structure of the battery unit 10 with the sealing plate 12 being opened whereby make the internal structure of the battery unit visible through the opening of the exterior container 11.

As shown in FIG. 4A, the upper end of the positive electrode tab 16 is joined to the back surface of the sealing plate 12, while the upper end of the negative electrode tab 17 is joined to a lead plate 13b, which extends from a lower end part 13a of the negative terminal 13 on the back side of the sealing plate 12.

The connection position of the aforementioned negative terminal 13 to the sealing plate 12 is located between the connection position of the positive electrode tab 16 to the sealing plate 12, and the connection position of the connection lead plate 31 as first lead to the sealing plate 12.

The connection lead plate 31 is positioned right above the negative electrode tab 17, while the lead-equipped safety device 32 as second lead is positioned right above the positive electrode tab 16.

The lead plates are joined to the terminals by resistance spot welding, laser welding, soldering, or the like.

Figure 4B:
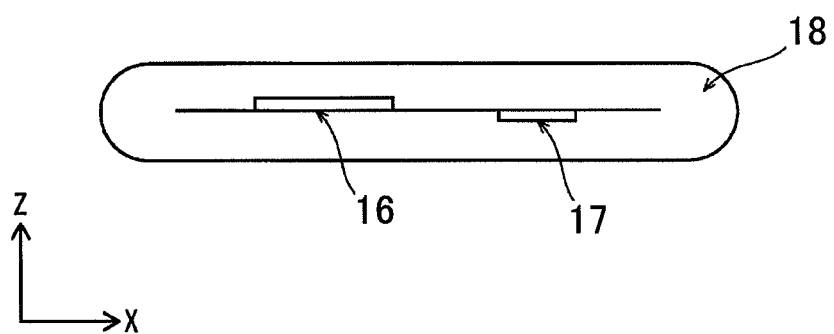
FIG. 4B is a cross-sectional view schematically showing the battery unit.

FIG. 4B is a cross-sectional view showing the front-and-rear directional (Z-directional) and right-and-left directional (Y-directional) positions of the positive and negative electrode tabs 16 and 17 relative to the electrode assembly 18.

The positive and negative electrode tabs 16 and 17 are located on the left and right sides as shown in FIGS. 2 to 4.

Although the positive and negative electrode tabs 16 and 17 are arranged in the front-and-rear directional (Z-directional) central part in FIG. 4B, the positive and negative electrode tabs may be arranged frontward or rearward.

A through hole is formed in the left end part of the circuit board 20, and passes through the circuit board 20. The external negative terminal 23b is connected to an upper surface part of the circuit board 20 around the upper end of the through hole by printed wiring, while the negative terminal land is connected to a lower surface part of the circuit board 20 around the lower end of the through hole by printed wiring.

Figure 5:
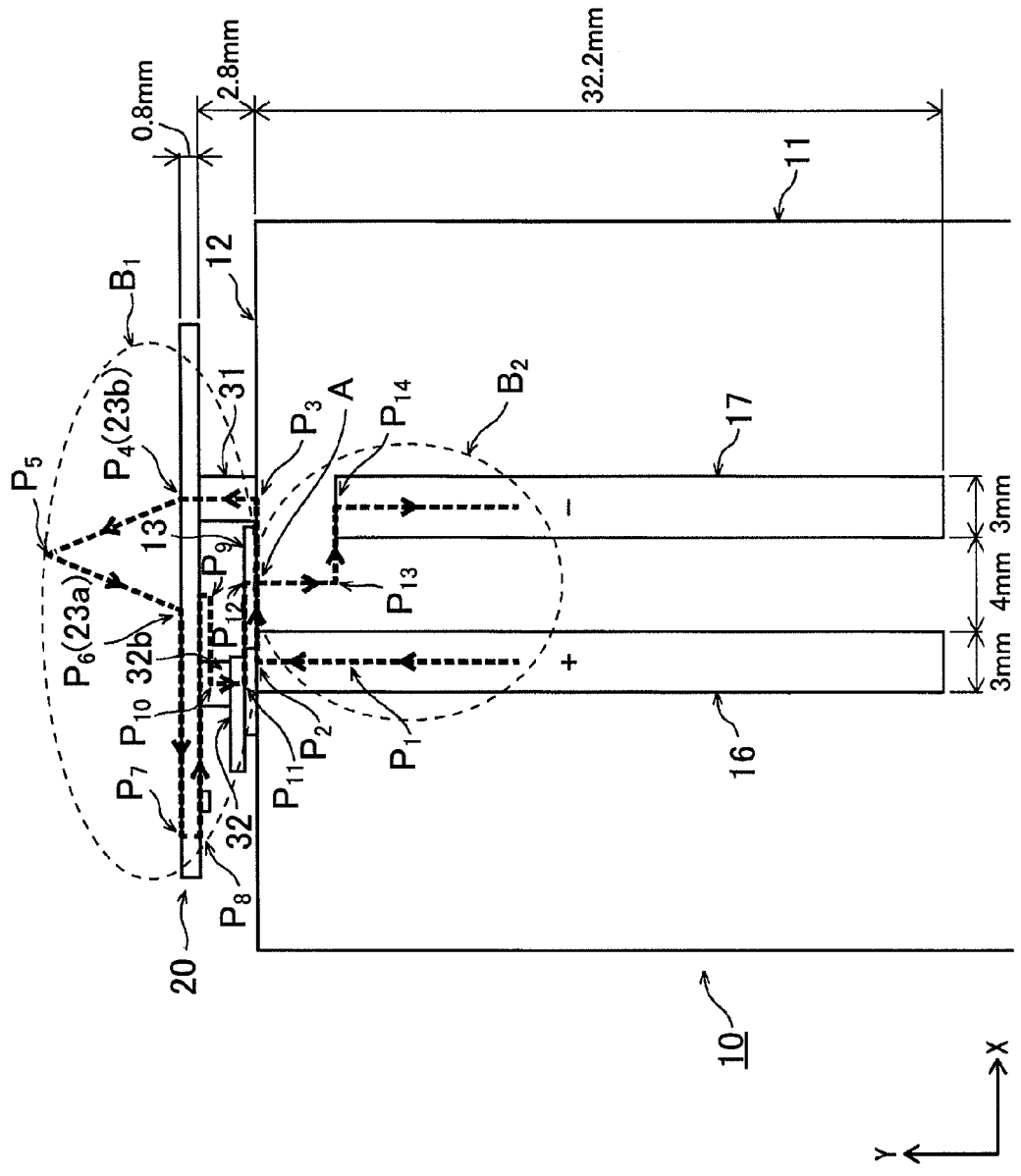
FIG. 5 is a diagram showing the current path of the battery pack 1 that is projected onto an X-Y plan view.

FIG. 5 is a diagram showing the current path of the battery pack 1 that is projected onto the plane (X-Y plane) that is parallel to the positive and negative electrode tabs 116 and 117, which are parallel to each other.

As shown in FIG. 5, the current loop that extends from the positive electrode plate of the electrode assembly back to the negative electrode plate of the electrode assembly passes points P1, P2, P3, P4, P5, P6, P7, P8, P9, P10, P11, P12, and P13 in this order.

The points P1 to P13 are positioned as follows.
P1: Upper part of positive electrode tab 16
P2: Connection between positive electrode tab 16 and sealing plate 12
P3: Connection between connection lead plate 31 and sealing plate 12
P4: External positive terminal 23a
P5: External load
P6: External negative terminal 23b
P7: Upper surface part of circuit board 20 around upper end of through hole passing through circuit board
P8: Lower surface part of circuit board 20 around lower end of through hole passing through circuit board
P9: Connection between negative terminal land of circuit board 20 and lead 32b
P10: Upper end of standup part of lead 32b
P11: Lower surface of PTC component 32a
P12: Upper end of negative terminal 13
P13: Lower end of negative terminal 13
P14: Upper end of negative electrode tab 17

One part of the wiring path of the current loop is defined as first wiring path, which extends from the positive electrode tab 16 through the sealing plate 12 and the circuit board 20 to the external positive terminal 23a (path part passing the points P1, P2, P3 and P4). Another part of the wiring path of the current loop is defined as second wiring path, which extends from the negative electrode tab 17 through the negative terminal 13, which passes through the sealing plate 12, and the circuit board 20 to the external negative terminal 23b (path part passing the points P14, P13, P12, P11, P10, P9, P8, P7 and P6).

As discussed above, the connection position between the negative terminal 13 and the sealing plate 12 is positioned between the connection position between the positive electrode tab 16 and the sealing plate 12, and the connection position between the connection lead plate 31 as the first lead and the sealing plate 12. Accordingly, the line that connects the point P2 to the point P3 intersects the line that connects the point P12 to point P13 in the part where the first and second wiring paths pass the sealing plate 12, which is arranged on the top of the battery unit 10. In FIG. 5, the point A shows the intersection.

It can be conceived that the above current loop can be divided into current loop parts B1 and B2. The current loop part B1 is formed on the exterior side of the battery unit 10, and extends from the intersection A through the circuit board 20 back to the intersection A. The current loop part B2 is formed on the interior side of the battery unit 10 relative to the intersection A.

The current loop part B1, which is formed on the exterior side of the battery unit 10, starts from the point A, then passes the points P3, P4, P5, P6, P7, P8, P9, P10, P11 and P12, and returns to the intersection A. The current loop part B2, which is formed on the interior side of the battery unit 10, can be obtained by connecting the current path section that extends from the positive electrode tab 16 through the points P1 and P2 and reaches the intersection A to the current path section that extends from the intersection A through the points P13 and P14 to the negative electrode tab 17.

The current flows counterclockwise in the current loop part B1 as viewed from the front side, while the current flows clockwise in the current loop part B2 as viewed from the front side.

Thus, the current flow direction in the current loop part B1, which is formed on the exterior side of the battery unit 10 and extends through the circuit board 20, is opposite to the current flow direction in the current loop part B2, which is formed on the interior side of the battery unit 10. Accordingly, the magnetic fields that are formed by the current loop parts B1 and B2 can cancel each other in the location close to the intersection A.

In particular, since the connection lead plate 31 as first lead is positioned right above the negative electrode tab 17, the path part that extends between the points P3 and P4 is located close to the path part that is located below the point P14. As a result, the opposite magnetic fields that are formed by these path parts can cancel each other. Also, since the lead-equipped safety device 32 as second lead is positioned right above the positive electrode tab 16, the path part that extends between the points P1 and P2 is located close to the path part that extends between the points P10 and P11. As a result, the opposite magnetic fields that are formed by these path parts can cancel each other. For this reason, it is possible to reduce the total strength of the magnetic fields that are produced by these parts.

As discussed above, according to the battery pack 1, the total strength of the magnetic fields that are produced by the current loops can be relatively small.

COMPARATIVE EXAMPLE

Figure 6:
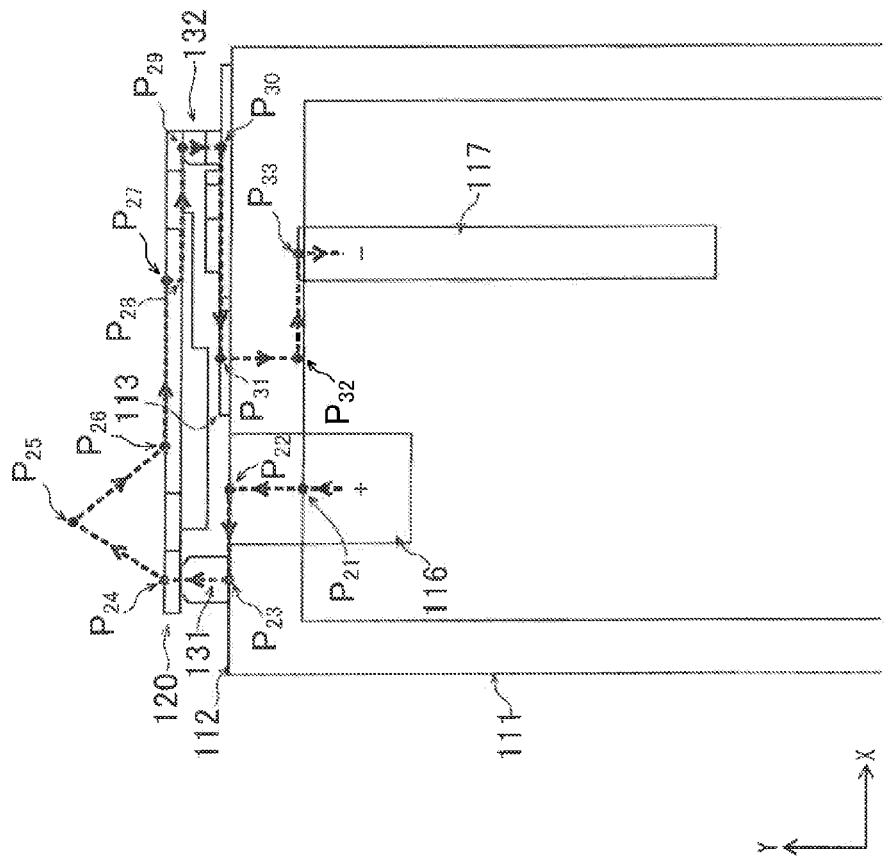
FIG. 6 is a diagram showing the current path of a conventional battery pack that is projected onto an X-Y plan view.

FIG. 6 is a diagram showing the current loop of a battery pack according to a comparative example that is projected onto the X-Y plan view.

As shown in FIG. 6, this current loop extends from the positive electrode tab through points P21, P22, P23, P24, P25, P26, P27, P28, P29, P30, P31, P32, and P33 in this order back to the negative electrode tab.

The points P21 to P33 are positioned as follows.
P21: Upper part of positive electrode tab
P22: Connection between positive electrode tab and sealing plate
P23: Connection between connection lead plate and sealing plate
P24: Positive terminal
P25: External load
P26: Negative terminal
P27: Upper surface part of circuit board around upper end of through hole passing through circuit board
P28: Lower surface part of circuit board around lower end of through hole passing through circuit board
P29: Connection between connection lead plate and electric conduction land of circuit board
P30: Connection between connection lead plate and PTC component
P31: Upper end of negative terminal
P32: Bent part of negative lead plate
P33: Connection between negative electrode tab and negative lead plate No intersection appears in the above projected current loop. Thus, the above projected current loop forms a single loop from the interior side of the battery unit through the exterior-side circuit board back to the interior side of the battery unit. The current flows clockwise in this current loop part as viewed from the front side.

As a result, a relatively strong magnetic field is formed by the current loop in the battery pack according to the comparative example as compared with the aforementioned battery pack 1.

Second Embodiment

Figure 7:
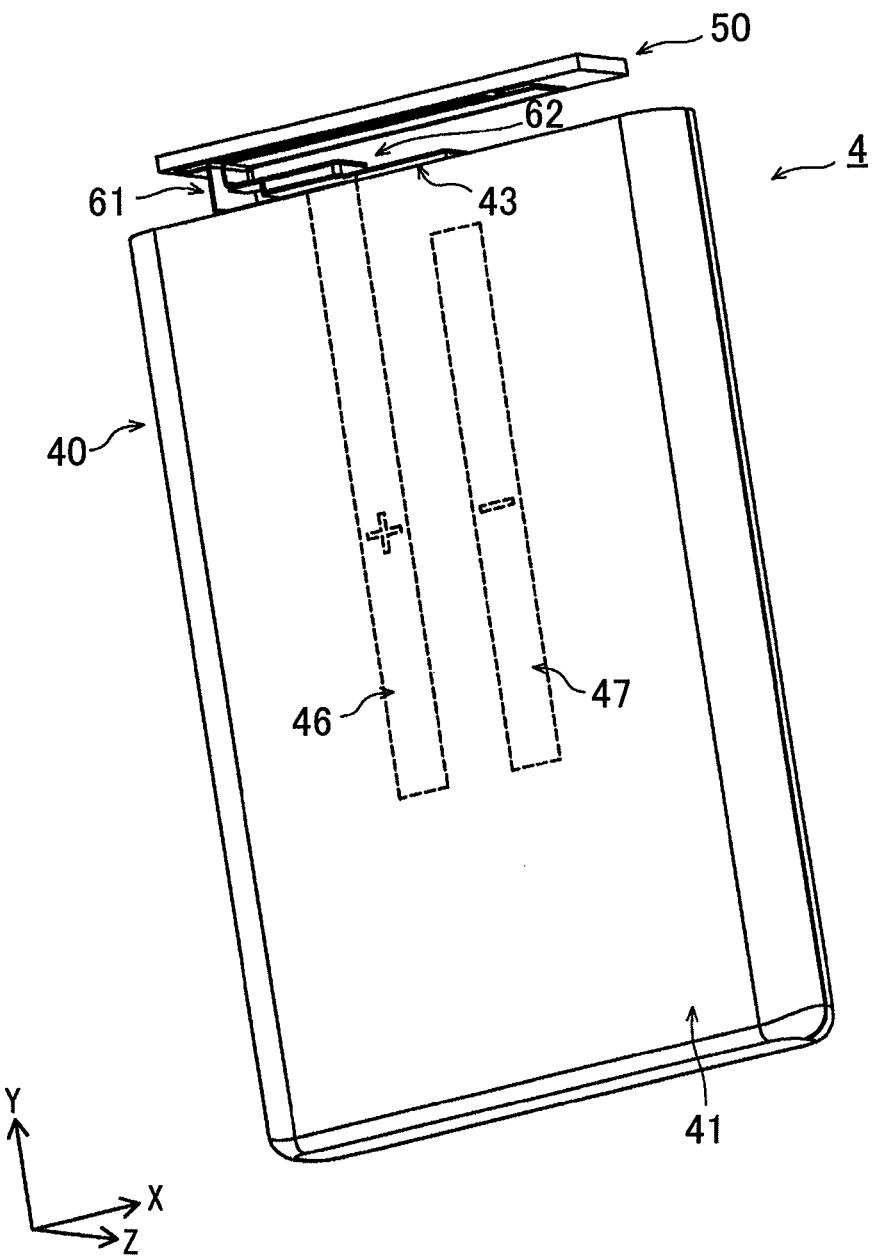
FIG. 7 is a perspective view showing a core pack 4 according to a second embodiment.
Figure 8:
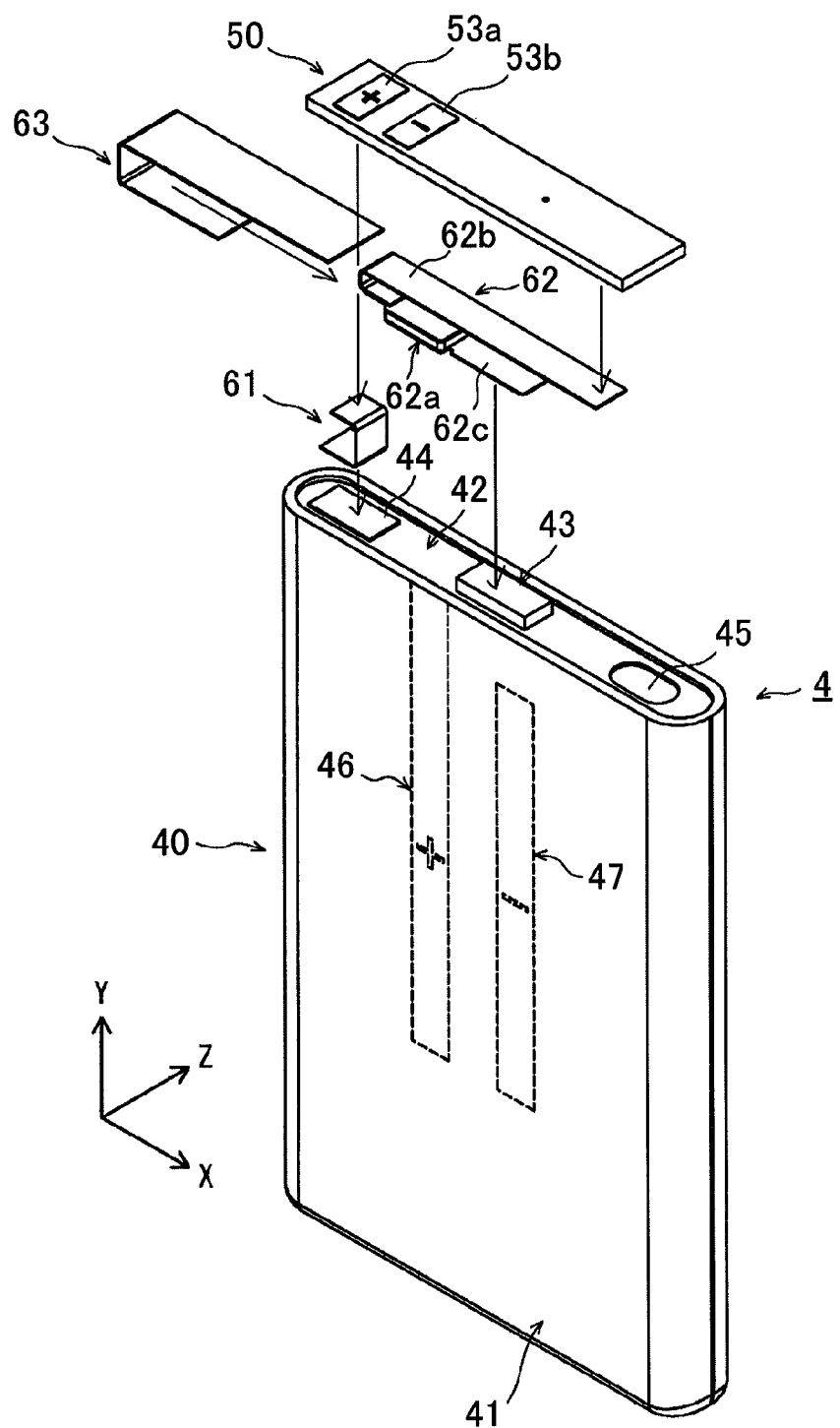
FIG. 8 is an exploded perspective view showing the core pack 4.

FIG. 7 is a perspective view showing a core pack 4 according to a third embodiment. FIG. 8 is an exploded perspective view showing the core pack 4.

A battery pack according to this embodiment has similar construction to the battery pack 1 according to the first embodiment except that, in the core pack 4, the first wiring path, which extends from the positive electrode tab 46 through the sealing plate 42 and the circuit board 50 to the external positive terminal 53a, does not intersect the second wiring path, which extends from the negative electrode tab 47 through the negative terminal 43, which passes through the sealing plate 42, and the circuit board 50 to the external negative terminal 53b, but the interval W between exterior-side path parts of the first and second wiring paths each of which extends between the circuit board 50 and the sealing plate 42 is smaller than the interval between interior-side path parts of the first and second wiring paths each of which is located on the interior side of the sealing plate 42.

The battery unit 40 in the core pack 4 has similar construction to the battery unit 10 according to the first embodiment. The negative terminal 43 is formed in a protrusion, and is arranged in the central part of the sealing plate 42, and the safety valve 45 is arranged in the right end part of the sealing plate. However, the positive terminal 44 as clad plate is arranged leftward relative to the negative terminal 43.

Similar to the battery unit 10 according to the first embodiment, the positive and negative electrode tabs 46 and 47 are accommodated in the exterior container 41 of the battery unit 40. The positive and negative electrode tabs extend from positive and negative electrodes of the electrode assembly, respectively. As shown in FIGS. 7 and 8, the positive and negative electrode tabs 46 and 47 extend in the top-and-bottom direction (Y direction), and spaced away from each other in right-and-left direction (X direction). The positive electrode tab 46 is positioned on the left side, while the negative electrode tab 47 is positioned on the right side.

The upper end of the positive electrode tab 46 is joined to the back surface of the sealing plate 42, while the upper end of the negative electrode tab 47 is joined to the lead plate that extends from the lower end of the negative terminal 43.

The circuit board 50 has similar construction to the circuit board 20 in the first embodiment. The external positive and negative terminals 53a and 53b for external connection are arranged on the upper surface of the circuit board, and the circuit board is arranged above and spaced at an interval away from the sealing plate 42 of the battery unit 40. However, the positive and negative terminal lands are arranged on the left and right end parts of the lower surface of the circuit board 50, respectively.

The connection lead plate 61 and the lead-equipped safety device 62, which form parts of the first and second wiring paths respectively, and the like, are arranged between the circuit board 50 and the sealing plate 42.

The connection lead plate 61 is a first lead member that extends from the sealing plate 42 to the circuit board 50. The connection lead plate is a U-shaped eclectically conductive plate for connecting the positive terminal 44 of the battery unit 40 to the positive terminal land that is arranged on the lower surface of the circuit board 50.

The lead-equipped safety device 62 is a second lead member that extends from the sealing plate 42 to the circuit board 50. The lead-equipped safety device 62 includes the PTC component 62a, and the leads 62b and 62c. The leads 62b and 62c are joined to the upper and lower surfaces of the PTC component 62a, respectively. The free end of the lead 62c is connected to the negative terminal 43 of the battery unit 40. The lead 62b is bent into a U shape. The free end of the lead 62b is connected to the negative terminal land of the circuit board 50. Thus, the negative terminal land of the circuit board 50 is connected to the negative terminal 43 of the battery unit 40 through the lead-equipped safety device 62.

As for the path part that extends from the negative terminal 43 through the lead-equipped safety device 62 to the negative terminal land of the circuit board 50, this path part extends along the lead 62c toward the connection lead plate 61 side (leftward) from the negative terminal 43, and passes through the PTC component 62a. After that, this path part extends along the lead 62b extends toward the connection lead plate 61 side (leftward), and then curves along the U shape of the lead 62b whereby extending rightward and reaching the negative terminal land.

Since the lead-equipped safety device 62 forms a path part that extends to a point close to the connection lead plate 61 on the way from the negative terminal 43 to the circuit board 50 so that the lead-equipped safety device 62 is arranged close to the connection lead plate 61, the area of the current loop part of the exterior side of the battery unit 40 can be small as discussed later. As a result, the strength of the magnetic field that is produced by this current loop part can be reduced.

An electrically insulating plate 63 is provided which is formed in a U shape, and covers the upper, lower and left side surface of the lead-equipped safety device 62. This electrically insulating plate 63 is arranged between the lead 62b and the lower surfaces of the circuit board 50, between the lead 62b and the connection lead plate 61, and between each of the leads 62b and 62c and the sealing plate 42 whereby electrically insulating the lead from the circuit board, the connection lead plate and the sealing plate.

Figure 9:
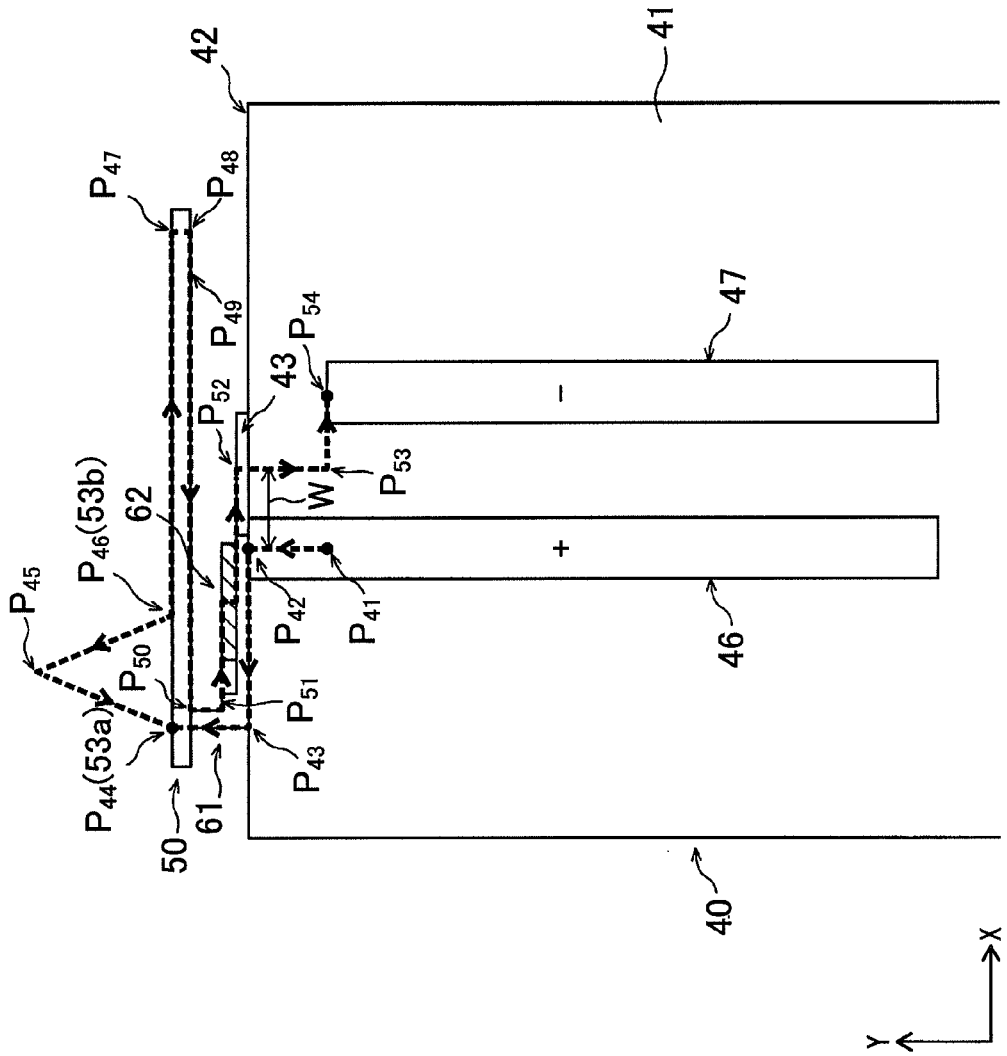
FIG. 9 is a diagram showing the current path of the battery pack according to the second embodiment that is projected onto an X-Y plan view.

FIG. 9 is a diagram showing the current path of the battery pack according to the second embodiment that is projected onto an X-Y plan view.

The current path passes the points P41, P42, P43, P44, P45, P46, P47, P48, P49, P50, P51, P52, P53, and P54 in this order in FIG. 9.

The points P41 to P54 are positioned as follows.
P41: Upper part of positive electrode tab 46
P42: Connection between positive electrode tab 46 and sealing plate 42
P43: Connection between connection lead plate 61 and sealing plate 42
P44: External positive terminal
P45: External load
P46: External negative terminal
P47: Upper surface part of circuit board 50 around upper end of through hole passing through circuit board
P48: Lower surface part of circuit board 50 around lower end of through hole passing through circuit board
P49: Connection between lead 62b and electric conduction land of circuit board 50
P50: Upper end of bent part of lead 62b
P51: Lower end of bent part of lead 62b
P53: Upper end of negative terminal 43
P54: Connection between negative electrode tab 47 and negative lead plate One part of the wiring path of the current loop is defined as first wiring path, which extends from the positive electrode tab 46 through the sealing plate 42, the connection lead plate 61 and the circuit board 20 to the external positive terminal 53a (path part passing the points P41, P42, P43 and P44). Another part of the wiring path of the current loop is defined as second wiring path, which extends from the negative electrode tab 47 through the negative terminal 43, which passes through the sealing plate 42, and the circuit board 50 to the external negative terminal 53b (path part passing the points P54, P53, P52, P51, P50, P49, P48, P47, and P46).

In this embodiment, the interval between exterior-side path parts of the first and second wiring paths is smaller than the interval W between the interior-side path parts of the first and second wiring paths. The exterior-side path part (path part that connects the point P43 to the point P44) of the first wiring path extends from the sealing plate 42 to the circuit board 50. The exterior-side path part (path part that connects the point P51 to the point P50) of the second wiring path extends from the sealing plate 42 to the circuit board 50. Each of the interior-side path parts is located on the interior side of the sealing plate 42. In the embodiment shown in FIG. 9, the interval W corresponds to the interval between the upper end of the positive electrode tab 46 and the lower end of the negative terminal 43, and is smaller than the interval between the positive and negative electrode tabs 46 and 47.

Specifically, in the battery unit 40, both the bent parts of the connection lead plate 61 and the lead 62b of the lead-equipped safety device 62 are located leftward relative to the negative terminal 43, and arranged close to each other. The path part of the connection lead 61 that connects the point P43 to the point P44 is arranged close to and extends in parallel to the path part of the lead 62b of the lead-equipped safety device 62 that connects the point P50 to the point P51.

Since the current path parts are arranged close to each other, and the current flow directions in the current path parts are in parallel but opposite to each other, the magnetic fields that are produced opposite to each other by the current path parts cancel each other.

Also, the path parts that extend along the upper and lower surfaces of the circuit board 50 are arranged close to each other, and the current flow directions in the path parts are in parallel but opposite to each other.

That is, the path part that extends along the upper surface of the circuit board 50 (path part that connects the point P46 to the point P47) is arranged close to and extends in parallel to the path part that extends along the lower surface of the circuit board 50 (path part that connects the point P49 to the point P50), and the current flow directions in these path parts are opposite to each other.

Since the current path parts are arranged close to each other, and the current flow directions in the current path parts are in parallel and opposite to each other in the entire area on the exterior side of the battery unit 40, the magnetic fields that are produced opposite to each other by the current path parts cancel each other.

As a result, in the battery pack of this embodiment, it is possible to reduce the strength of the magnetic field that is produced by the current loop part on the exterior side of the battery unit 40. Therefore, the strength of the produced magnetic field can be small as compared with the battery pack according to the foregoing comparative example.

Third Embodiment

Figure 10:
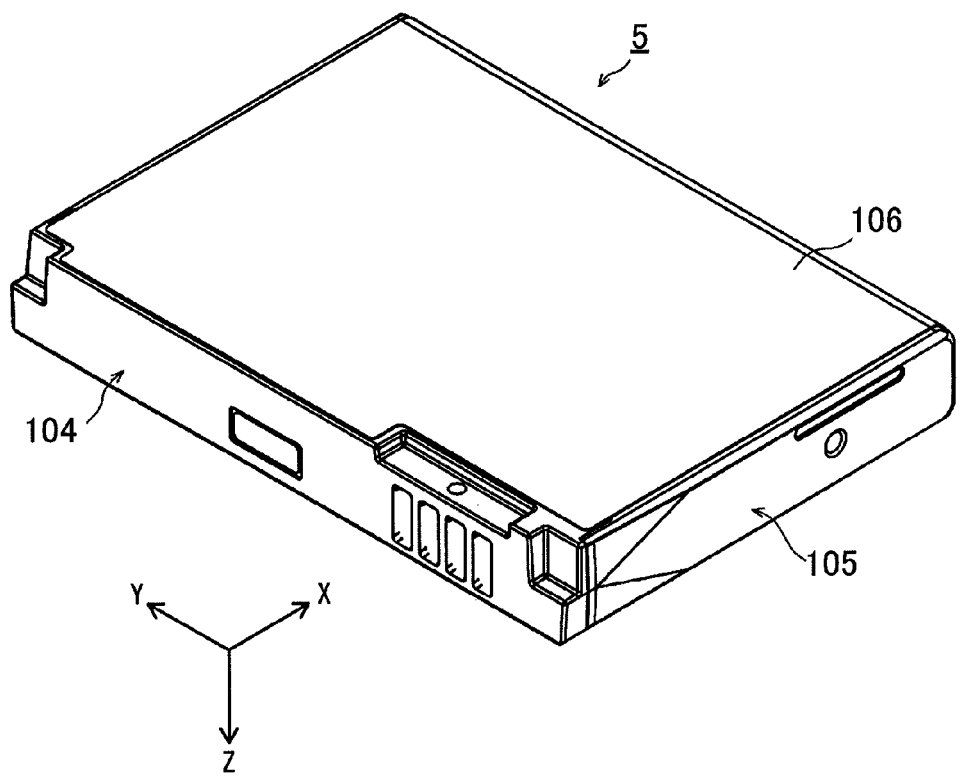
FIG. 10 is a perspective external view showing a battery pack 5 according to a third embodiment of the present invention.

FIG. 10 is a perspective external view showing a battery pack 5 according to a third embodiment of the present invention.

Figure 11:
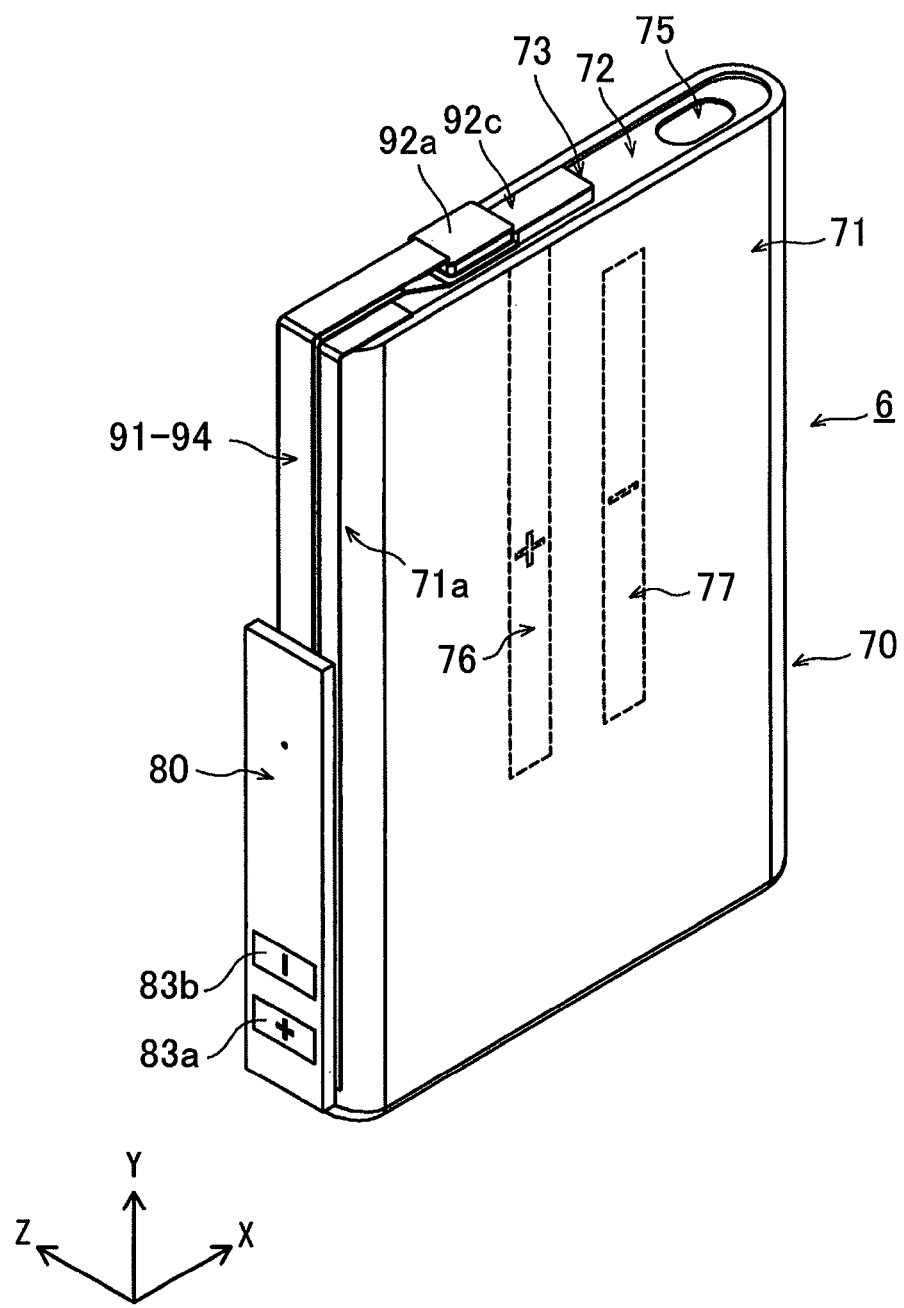
FIG. 11 is a perspective view showing a core pack 6 according to the third embodiment.
Figure 12:
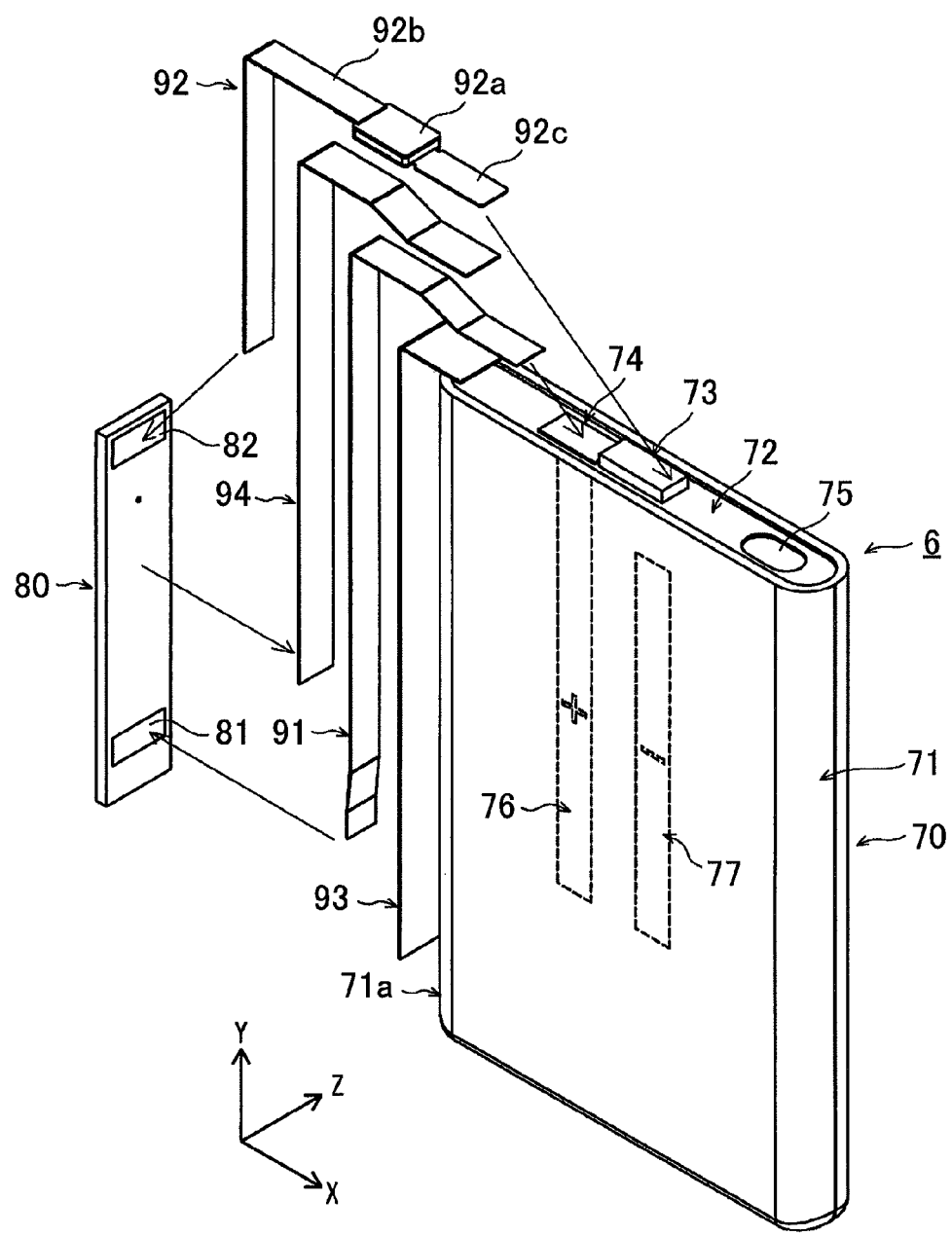
FIG. 12 is an exploded perspective view showing the core pack 6.

FIG. 11 is a perspective view showing the core pack 6. FIG. 12 is an exploded perspective view showing the core pack 6.

The battery pack 5 according to this embodiment includes the core pack 6 having a rectangular battery unit 70, and a circuit board 80. The circuit board 80 extends on the side surface of the rectangular battery unit 70. The resin molding member 104 covers the circuit board and the connection lead in the core pack 6. The bottom plate 105 is attached onto the bottom of the battery unit. The exterior label 106 is stuck onto the battery unit 70, and covers an exterior side surface of the battery unit 70.

In the pack according to this embodiment, the interval between exterior-side path parts of the first and second wiring paths each of which extends from the sealing plate 72 to the circuit board 80 is smaller than the interval between interior-side path parts of the first and second wiring paths each of which is located on the interior side of the sealing plate 72. The first wiring path extends from the positive electrode tab 76 through the sealing plate 72 and the circuit board 80 to the external positive terminal 83a. The second wiring path extends from the negative electrode tab 77 through the negative terminal 73, which passes through the sealing plate 72, and the circuit board 80 to the external negative terminal 53b.

The construction of the core pack 6 is now described.

The battery unit 70 has similar construction to the battery unit 40 according to the second embodiment. The negative terminal 73 is formed in a protrusion, and is arranged in the central part of the sealing plate 72, and the safety valve 75 is arranged in the right end part of the sealing plate. The positive terminal 74 as clad plate is arranged leftward relative to the negative terminal 73.

The positive and negative electrode tabs 76 and 77 are accommodated in the exterior container 71 of the battery unit 70. The positive and negative electrode tabs extend from positive and negative electrodes of the electrode assembly, respectively. As shown in FIGS. 11 and 12, the positive and negative electrode tabs 76 and 77 extend in the top-and-bottom direction (Y direction), and spaced away from each other in right-and-left direction (X direction). The positive electrode tab 76 is positioned on the left side, while the negative electrode tab 77 is positioned on the right side.

The circuit board 80 has similar construction to the circuit board 50 in the second embodiment. The external positive and negative terminals 83a and 83b for external connection are arranged on the surface of the circuit board. The circuit board is arranged on the left side surface 71a of the exterior container 71 of the battery unit 70. The positive and negative terminal l and 81 and 82 are arranged on the lower and upper end parts of the back surface of the circuit board 80, respectively.

A connection lead plate 91, a lead-equipped safety device 92, and electrically insulating plates 93 and 94 extend from the left side surface 71a of the exterior container 71 to the surface of the sealing plate 72, and are arranged on one after another.

The connection lead plate 91 is a first lead member that forms a part of the first wiring path. The connection lead plate is formed of an electrically conductive plate that is bent into an L shape. The connection lead plate extends along the left side surface 71a of the exterior container 71 from the positive terminal 74 of the battery unit 70 to the positive terminal land 81, which is arranged on the back surface of the circuit board 80, whereby connecting the positive terminal to the positive terminal land.

The lead-equipped safety device 92 is a second lead member that forms a part of the second wiring path. The lead-equipped safety device includes the PTC component 92a, and the leads 92b and 92c. The leads 92b and 92c are joined to the upper and lower surfaces of the PTC component 92a, respectively. The lead 92c is connected to the negative terminal 73 of the battery unit 70. The lead 92b is bent into an L shape. The free end of the lead 92b is connected to the negative terminal land 82 of the circuit board 80.

Thus, the lead-equipped safety device 92 extends from the negative terminal 73 of the battery unit 70 to the negative terminal land 82 of the circuit board 80 whereby connecting the negative terminal to the negative terminal land.

The electrically insulating plate 93 is bent into an L shape. The electrically insulating plate 93 is interposed between the connection lead plate 91, and the exterior container 71 and the sealing plate 72 whereby electrically insulating the connection lead plate from the exterior container and the sealing plate. The electrically insulating plate 94 is also bent into an L shape. The electrically insulating plate 94 is interposed between the lead plate 91 and the lead-equipped safety device 92 whereby electrically insulating the lead plate from the lead-equipped safety device.

The electrically insulating plates 93 and 94 are formed from an electrically insulating paper with thickness of approximately 0.15 mm. In the case where the electrically insulating plates 93 and 94 are inserted, the interval between the first and second wiring paths can be not smaller than 0.15 mm, it is possible to surely electrically insulate the first and second wiring paths from each other.

Figure 13:
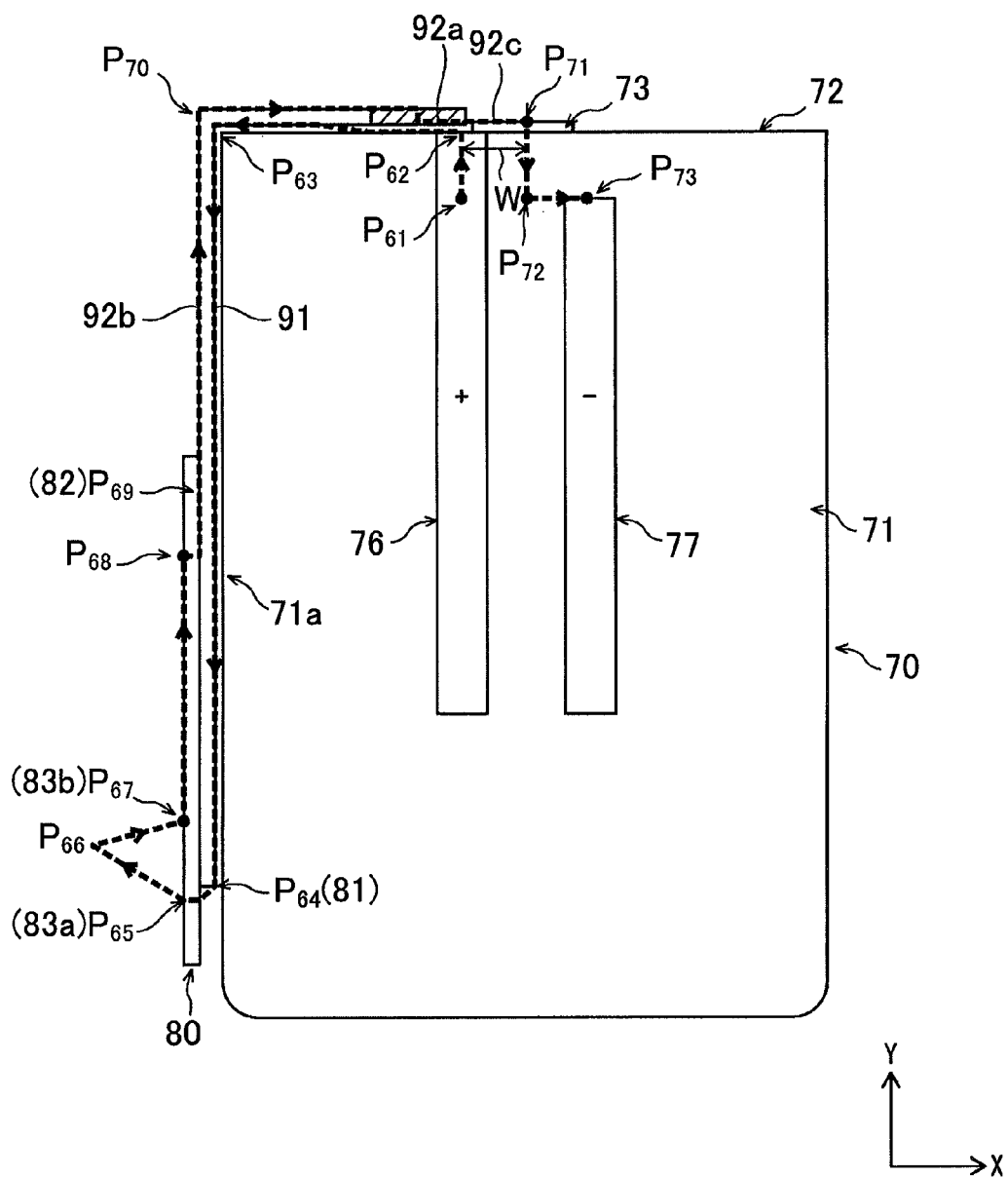
FIG. 13 is a diagram showing the current path of the battery pack 5 that is projected onto an X-Y plan view.

FIG. 13 is a diagram showing the current path of the battery pack 5 that is projected onto the X-Y plan view.

The current path passes the points P61, P62, P63, P64, P65, P66, P67, P68, P69, P70, P71, P72, and P73 in this order in FIG. 13.

The points P61 to P74 are positioned as follows.
P61: Upper part of positive electrode tab 76
P62: Connection between positive electrode tab 76 and sealing plate 72
P63: Bent part of connection lead plate 91
P64: Positive terminal land 81
P65: External positive terminal 83a
P66: External load
P67: External negative terminal 83b
P68: Surface part of circuit board 80 around through hole passing through circuit board
P69: Connection between lead 92b and negative electric conduction land 82
P51: Bent point of lead 92b
P71: Upper end of negative terminal 73
P72: Bent part of negative lead plate
P73: Connection between negative electrode tab 77 and negative lead plate One part of the wiring path of the current loop is defined as first wiring path, which extends from the positive electrode tab 76 through the sealing plate 72, the connection lead plate 91 and the circuit board 80 to the external positive terminal 83a (path part passing the points P61, P62, P63, P64 and P65). Another part of the wiring path of the current loop is defined as second wiring path, which extends from the negative electrode tab 77 through the negative terminal 63, which passes through the sealing plate 42, the lead-equipped safety device 92 and the circuit board 80 to the external negative terminal 83b (path part passing the points P73, P72, P71, P70, P69, P68, and P67).

In this embodiment, the interval between exterior-side path parts of the first and second wiring paths is smaller than the interval W between the interior-side path parts of the first and second wiring paths. The exterior-side path part (path part that is formed by the connection lead plate 91, and connects the points P62, P63 and P64 to each other) of the first wiring path extends from the sealing plate 42 to the circuit board 50. The exterior-side path part (path part that is formed by the lead-equipped safety device 92, and connects the points P69, P70 and P71 to each other) of the second wiring path extends from the sealing plate 42 to the circuit board 50. Each of the interior-side path parts is located on the interior side of the sealing plate 42. As a result, the magnetic fields that are produced opposite to each other by the current path parts cancel each other. In the embodiment shown in FIG. 13, the interval W corresponds to the interval between the upper end of the positive electrode tab 76 and the lower end of the negative terminal 73, and is smaller than the interval between the positive and negative electrode tabs 76 and 77.

In addition, the path part of the first wiring path that extends along the circuit board 80 (path part that connects the point P63 to the point P64) is arranged close to and extends in parallel to the path part that extends from the external negative terminal 83b to the negative terminal land 82 of the circuit board 80 (path part that connects the points P67, P68 and P69 to each other), and the current flow directions in these path parts are opposite to each other. As a result, the magnetic fields that are produced opposite to each other by the current path parts also cancel each other.

As discussed above, in the battery pack 5, the current path parts are arranged close to each other and extend in parallel to each other on the exterior side of the battery unit 70, and the current flow directions in these path parts are opposite to each other. As a result, the magnetic fields that are produced opposite to each other by the current path parts cancel each other. Therefore, the strength of the magnetic field that is produced on the exterior side of the battery unit 70 can be small as compared with the battery pack according to the foregoing comparative example.

EXAMPLES

Strength components (Bx, By, Bz) of the magnetic field are measured in the X, Y and Z directions for battery packs according to examples 1 and 2, which correspond to the foregoing first and second embodiments, respectively, and the comparative example.

The battery packs according to examples 1 and 2, and the comparative example include the same specifications (e.g., exterior container of battery unit, electrode assembly, positive electrode and negative electrode tabs), and supply the same amount of current.

Table 1 shows maximum strength values (dB) of areas where the maximum strength magnetic fields are observed in the X, Y and Z directions.

TABLE 1

| | Bx (dB, Max.) | | By (dB, Max.) | | Bz (dB, Max.) | |
|---|---|---|---|---|---|---|
| | Norm. Dir. | Op. Dir. | Norm. Dir. | Op. Dir. | Norm. Dir. | Op. Dir. |
| Ex. 1 | 5.67 | 5.36 | 1.86 | 12.60 | 11.88 | 13.75 |
| Ex. 2 | 9.53 | 9.82 | 8.25 | 13.87 | 12.01 | 17.04 |
| Comp. Ex. | 9.49 | 10.04 | 10.73 | 12.23 | 12.64 | 18.68 |

The maximum strength values of the magnetic field components are observed in the following battery pack areas. In addition, the areas are shown by reference sings (Q1 to Q6) in FIG. 2.

Bx Normal direction: Upper right area of battery unit (Q1)
Bx Opposite direction: Upper left area of battery unit (Q2)
By Normal direction; Upper area of circuit board (Q3)
By Opposite direction: Central area of battery unit (Q4)
Bz Normal direction; Lower end area of battery unit (Q5)
Bz Opposite direction: Upper end area of battery unit (Q6)

According to the result shown in Table 1, it is found that the strength values of the magnetic fields in the examples 1 and 2 can be reduced as compared with the comparative example, and in particular that the strength value of the magnetic fields in the example 1 can be effectively reduced.

Modified Embodiment, Etc.

Although it has been described that the sealing plate of the battery unit serves as the positive terminal, and the negative terminal passes through the sealing plate in the foregoing first to third embodiments, the sealing plate of the battery unit may serve as the negative terminal, and the positive terminal pass through the sealing plate. In this case, the negative electrode tab is connected to the sealing plate, while the positive electrode tab is connected to the positive terminal.

Also, it has been described that a lithium ion battery is used as the battery unit included in the battery pack, the type of the battery unit included in the battery pack is not limited. A rectangular alkaline cell or the like may be used as the battery unit.

The present invention is suitable for battery packs for the mobile electronic devices, in particular for battery packs that include a rectangular battery unit.

The invention claimed is:

1. A battery pack comprising:
a battery unit that includes a bottom-closed hollow exterior container, an electrode assembly of positive and negative electrode plates that face each other and are accommodated in the exterior container, positive and negative electrode tabs that extend from said positive and negative electrode plates and are arranged in parallel to each other in said exterior container, and a sealing plate that closes the opening of said exterior container;
a circuit board that is arranged on or above an exterior surface of said battery unit, and includes external positive and negative terminals through which electric power can be supplied;
a first wiring path that connects said positive electrode tab to said external positive terminal through said sealing plate and said circuit board; and
a second wiring path that connects said negative electrode tab to said external negative terminal through said circuit board,
wherein a current loop is formed from said positive electrode plate through said positive electrode tab, said first wiring path, said external positive terminal, said external negative terminal, said second wiring path and said negative electrode tab in this order to said negative electrode plate when electric power is supplied, and wherein as viewed in a plan view along said positive and negative electrode tabs, which are arranged in parallel to each other, in the current loop shape that is projected onto this plan view, said first and second wiring paths intersect each other at the position where said first and second wiring paths pass said sealing plate, and wherein the current flow direction of a current loop part that is formed from the intersection position on the exterior side of the battery unit is opposite to the current flow direction of another current loop part that is formed from the intersection position on the interior side of the battery unit.

2. The battery pack according to claim 1, wherein said exterior container has a rectangular box shape, wherein said positive and negative electrode tabs extend toward said sealing plate in said exterior container, and wherein said circuit board extends along and is spaced away from the exterior surface of said sealing plate.

3. The battery pack according to claim 2, wherein the negative terminal passes through and is electrically insulated from the sealing plate, wherein, in said first wiring path, said positive electrode tab is connected to an interior surface of said sealing plate, and said sealing plate is connected through a first lead to said circuit board, wherein said negative terminal is positioned between the connection position between said sealing plate and said positive electrode tab, and the connection position between said sealing plate and said first lead, wherein, in said second wiring path, said negative electrode tab is connected to said negative terminal on the interior side of said sealing plate, and a second lead member is provided which is arranged on the exterior side of said sealing plate and extends from said negative terminal to said circuit board.

4. The battery pack according to claim 3, wherein said first lead is positioned right above said negative electrode tab, and said second lead is positioned right above said positive electrode tab.

5. A battery pack comprising:

a battery unit that includes a bottom-closed hollow exterior container, an electrode assembly of positive and negative electrode plates that face each other and are accommodated in the exterior container, positive and negative electrode tabs that extend from said positive and negative electrode plates and are arranged in parallel to each other in said exterior container, and a sealing plate that closes the opening of said exterior container;

a circuit board that is arranged on or above an exterior surface of said battery unit, and includes external positive and negative terminals through which electric power can be supplied;

a first wiring path that connects said positive electrode tab to said external positive terminal through said sealing plate and said circuit board; and a second wiring path that connects said negative electrode tab to said external negative terminal through said circuit board, wherein a current loop is formed from said positive electrode plate through said positive electrode tab, said first wiring path, said external positive terminal, said external negative terminal, said second wiring path and said negative electrode tab in this order to said negative electrode plate when electric power is supplied, and wherein the interval between exterior-side path parts of said first and second wiring paths each of which extends from said sealing plate to said circuit board is smaller than the interval between interior-side path parts of said first and second wiring paths each of which is located on the interior side of said sealing plate, and wherein current flow directions in the exterior-side path parts are opposite to each other.

6. The battery pack according to claim 5, wherein said exterior container has a rectangular box shape, wherein said positive and negative electrode tabs extend toward said sealing plate in said exterior container, and wherein said circuit board extends along and is spaced away from the exterior surface of said sealing plate, wherein the negative terminal passes through and is electrically insulated from the sealing plate, wherein a first lead member is provided which extends from said sealing plate to said circuit board in the first wiring path, wherein a second lead is provided which extends from said negative terminal to said circuit board, and wherein said second lead member extends toward said first lead member from said negative terminal before reaching said circuit board.

7. The battery pack according to claim 5, wherein said exterior container has a rectangular box shape, wherein said positive and negative electrode tabs extend toward said sealing plate in said exterior container, wherein said circuit board extends along a side surface as said exterior surface of said exterior container, wherein the negative terminal passes through and is electrically insulated from the sealing plate, wherein a first lead member is provided which extends from said sealing plate to said circuit board through the side of said exterior container in the first wiring path, and wherein a second lead member is provided in said second wiring path, and wherein the second lead member extends from said negative terminal to said circuit board, and faces said first lead member.

8. The battery pack according to claim 5, wherein the interval between said first and second wiring paths is not smaller than 0.15 mm.

* * * * *